Jan. 17, 1939. W. TRAUTNER 2,144,096
SIGNAL LAMP LENS
Filed Nov. 15, 1937 2 Sheets-Sheet 2
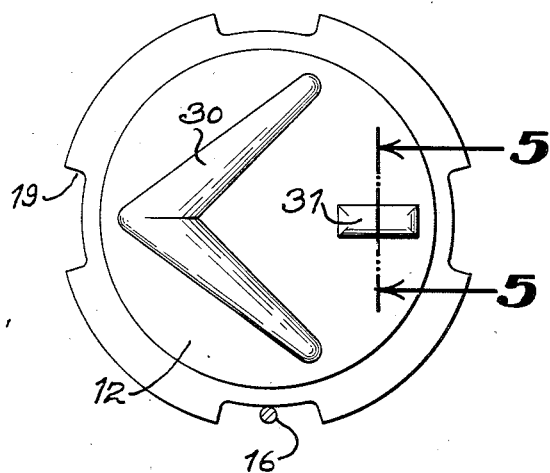
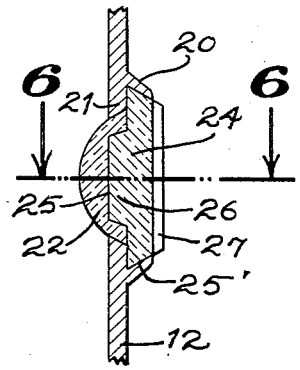
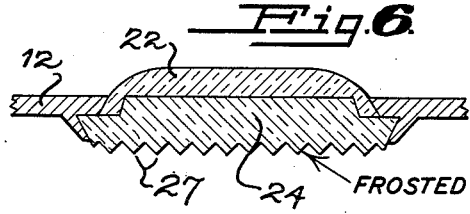
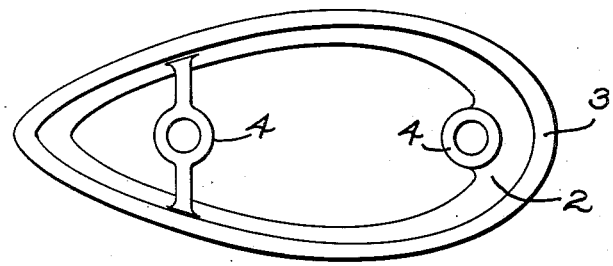
INVENTOR,
WAGN TRAUTNER.
BY
Lippincott & Metcalf
ATTORNEYS.

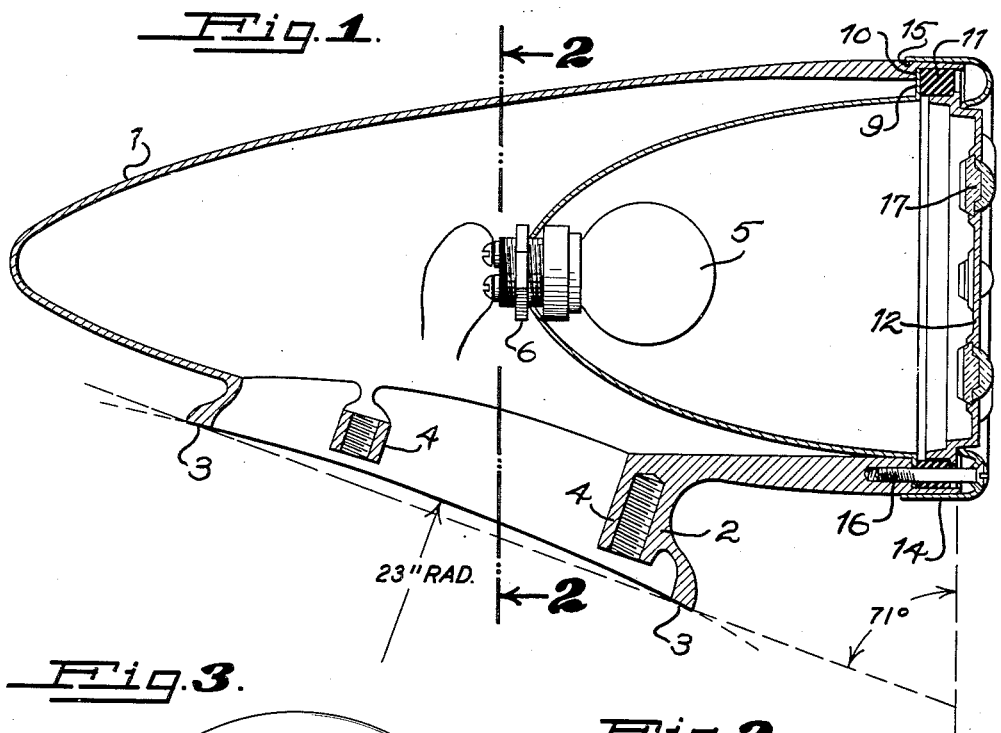
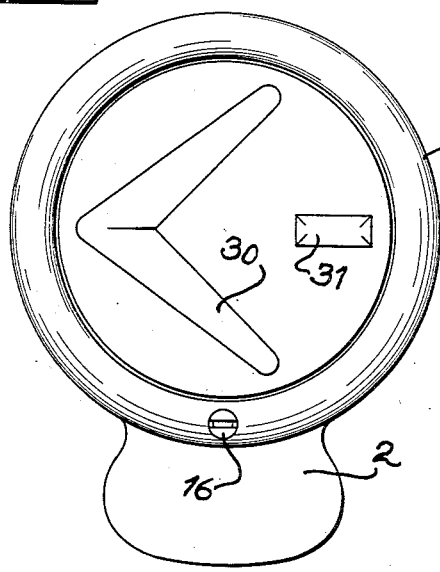
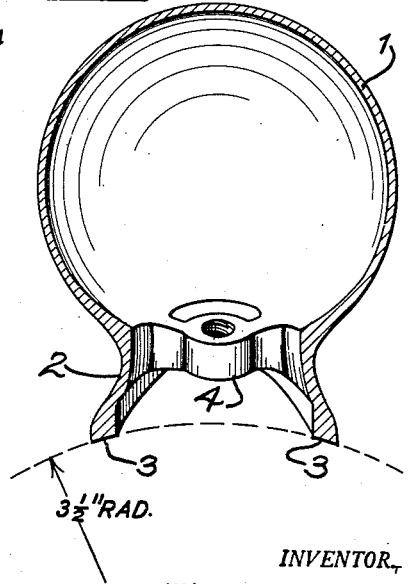

Patented Jan. 17, 1939

2,144,096

UNITED STATES PATENT OFFICE 2,144,096

SIGNAL LAMP LENS

Wagn Trautner, Springdale, Ohio, assignor to E. H. Kueffer, Oakland, Calif.

Application November 15, 1937, Serial No. 174,572

5 Claims. (Cl. 177—329)

My invention relates to a signalling lens, and more particularly, to such a lens as having peculiar advantages when used in conjunction with a signal lamp on automotive vehicles.

This application discloses subject matter shown and claimed in my companion application entitled "Signal lamp bracket", Serial No. 174,573, filed simultaneously with the present application.

Among the objects of my invention are: To provide a signalling lens or window for a signalling lamp, wherein the danger of a false indication, due to exterior light, is greatly reduced; to provide a signal lens wherein a maximum of exterior light is reflected therefrom and a maximum of interior light is transmitted therethrough; to provide a colored signal lens having a structure designed to prevent false signals being caused by outside illumination; to provide a signal lens wherein outside light reflected from the lens will be substantially colorless, and wherein the light transmitted through the lens will be colored; and to provide a lens or translucent window for a light source which will greatly reduce the possibility of a false signal when illuminated with outside light.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

The word lens is used broadly herein as denoting a light transmitting window, irrespective of light ray concentration.

Signal lamps are utilized for various purposes on automobiles. The tail lamp may be taken as a typical example, and in such a lamp there is, as a general rule, a light source in the form of an incandescent bulb operating from the battery of the automobile, a lamp housing, and a window facing to the rear, this window usually comprising a red lens of varying configurations, in accordance with the ideas of various manufacturers.

It may also be stated, as a general rule, that such warning lamps have, for a red lens, a lens which is well provided with prismatic reflecting surfaces on the surface adjacent the light source, so that when the lens is illuminated by outside light, such as the sun in the day time or other motor lamps at night time, a colored reflection will be seen, giving some measure of protection and a reflected signal, even though the lamp bulb is burned out or otherwise out of order.

Even when stop signals are utilized on automobiles, a somewhat similar lens is used, and many times it is the same lens as used for the tail light. Consequently, the reflection of outside light, which is advantageous in the case of a continuous signal such as the tail light, will be very obviously a disadvantage in the case of the stop light, because the stop light obviously should only be visible when its own light source within is energized.

Several schemes are used to overcome this difficulty in the case of the intermittently actuated stop lights, and the usual manner by which false indications are combatted is to use a very high candle power lamp in the stop signal, so that the actual stop signal will be a great deal brighter than any reflected signal. However, even with large candle power lamps in stop signals, it is very difficult, in many cases, to obtain an adequate warning in full sun, and my invention herewith presented is ideally adapted for signals such as stop lights, in order to greatly reduce the possibility of obtaining a false signal at any time, even in full sun or under the full illumination from outside headlights.

My invention is still more advantageous in its application to a directional signal which, up to now, has hardly been satisfactory for use in daylight. A directional signal differs greatly from a stop light; a stop lamp need give no definite configuration, that is, all that is necessary is gross illumination through a red or amber filter or lens. On the other hand, a directional signal not only requires adequate illumination, but in addition requires definition, and in order for the directional signal to be satisfactory, this definition must not only be satisfactory in the day time under the full glare of the sun, but also must be substantially unaffected by all other outside light, such as the full sun in the day time or headlights at night, whereby a false indication might be given, and my invention has therefore solved the problem of a directional index marker which can be adequately and predeterminedly illuminated and which will not give a false indication by light falling upon it from outside sources, such as, for example, the sun in the day time or headlights at night.

Broadly as to method, I utilize multiple surfaces, preferably in a composite lens, and reflect a large portion of the outside light through a colorless material which will thus give no confusing false indication. I transmit light through the composite lens to give a colored indication, and I so design the various surfaces of the composite lens that a minimum of outside light can enter the interior of the signal lamp, to be thereafter transmitted back through the lens to the onlooker, whereas an adequate interior illumination can give the desired signal.

I have thus been able to produce an index lens which is operable with great clarity and definition in the day time or at night, under the full glare of the sun or headlights, but which will not, under the same conditions, give a reflected indication leading to false conclusions by the onlooker. Therefore, my lens is ideally adapted for use in conjunction with a directional signalling system, and will be described by me as used in one such signal system, such as that shown, described and claimed by Clarence B. Howard in his application for United States Letters Patent entitled "Vehicle signalling system", Serial No. 135,921, filed April 9, 1937, although it will be obvious to those skilled in the art that the lens herein described and claimed can be utilized in other signalling systems, either directional or non-directional, or in any signal lamp where false indications are to be minimized, irrespective of whether or not a defined index is to be illuminated. It will also be obvious that the advantages of my invention are equally applicable to stationary signalling systems, such as railroad installations and the like.

Referring to the drawings:

Fig. 1 is a longitudinal sectional view through a preferred embodiment of my invention, as applied to a vehicle signal lamp, showing basal curvature and lens plane angle.

Fig. 2 is a cross sectional view, taken as indicated by the line 2—2 in Fig. 1.

Fig. 3 is an end view of the lamp shown in Fig. 1.

Fig. 4 is a plan view of the lamp mask and index marker.

Fig. 5 is a cross sectional view of mask and index lens, taken as indicated by the line 5—5 in Fig. 4.

Fig. 6 is a longitudinal sectional view of the index lens and mask, taken as indicated by the line 6—6 in Fig. 5.

Fig. 7 is a plan view of the basal surface of the lamp.

Referring directly to the drawings, an incandescent lamp 5 is positioned within the lamp house 1 in a lamp base 6, so that the lamp 5 is in the focus of a reflector 7. This reflector, of any common automotive lamp type, has an outturned lip 9 fitting a shoulder 10 in the large open end of the lamp house, and the lip is held against the shoulder by a resilient gasket 11 against which is pressed a mask 12, the mask being maintained in place by a cover 14 fixed in position at the top by lug 15 and at the bottom by cover screw 16. The mask 12 supports an index lens 17, and the angle of the mask plane is preferably set at 71° to a line constituting a chord of the 23″ cylindrical curvature passing through the longest dimension of the streamline basal surface shape.

Mask 12 is shown in plan in Fig. 4, and it will be seen that the mask edge is provided with four peripheral slots 19, spaced 90° apart, and each having a length of not less than 30° of the peripheral arc, thus allowing the index lens 12 to be rotated to fit conditions to be described later.

Figs. 5 and 6 show the preferred construction of the index marker. The mask 12 is provided on its inner surface with a lip 20 projecting inwardly, the main body of the mask projecting beyond lip 20 to form a mounting flange 21. The opposed surfaces of this mounting flange 21 are shaped to fit the curvature of an outside lens component 22, which is preferably semicircular in section along its shortest dimension and preferably of colorless light transmitting material. By colorless, I do not mean that it need be crystal clear, but I do desire that it shall at least be a white or nearly white translucent material, or crystalline clear, preferably, however, the latter.

A rear component 24 is provided, wider than the front component 22, and having angular sides 25′ so that lip 20 may be forced thereagainst to cooperate therewith to lock the entire structure together and to the mask. I prefer to join the front and rear components, at least over the major part thereof, to form a planar junction 25, and I prefer that this junction be cemented to remove double reflections and to prevent air bubbles therein, and I also prefer to make the center section 26 of the rear component thicker than the edge section. The rear surface of the rear or colored component facing light source 5 is provided with prismatic ridges 27, and all surfaces of these ridges are preferably frosted to reduce reflection therefrom. It is preferable that the rear surface of the front component be polished.

I also prefer to form both front and rear components of this lens from mouldable plastics, or what is popularly known as "unbreakable glass", now well known in the industry. Under these circumstances, lip 20 may be readily applied with pressure against the various components of the plastic lens so that they will be held firmly in position, and as will readily be seen, when lip 20 is forced into final position, the entire lens is firmly locked in position in the mask slot.

I also prefer to run the prismatic ridges across the narrowest dimension of the lens in case a defined directional index is utilized, such as shown in Fig. 4, where one portion of the lens defines an arrow head 30 and another portion defines an arrow shaft 31. Other indexing configurations will of course be immediately apparent to those skilled in the art, and the cross section shown in Fig. 5, of course, may be changed in dimension so that the lens may be built without indexing characteristics for use, for example, as a stop light, where only a gross light source is needed and no other indication desired.

Referring directly to Figs. 5 and 6 for the optical operation of the lens, it will be seen that the curved colorless component faces exterior illumination, whereas the colored rear component faces the interior light source. Outside illumination will pass through colorless component 22 until the junction of the two components is reached, and inasmuch as I prefer to highly polish surfaces entering into this junction, light reflection at this point is very high, and all light so reflected will come back to an onlooker as colorless.

However, in case any outside light should pass through the junction 25 to the rear surface 27 of the rear colored component, a great deal of this light will be absorbed and not reflected because of the fact that this rear surface is frosted, and therefore, any light which is absorbed at this point is not reflected back to the outside onlooker. Furthermore, if outside light should pass through the reflecting junction 25 and through the frosted surface into the interior of the lamp, this light will be completely broken up and thrown out into the interior of the lamp housing at random angles, thus preventing any concentration of interior light from the outside passing back through the lens to the onlooker to give the false illumination I avoid.

Under extensive trials it has been found that with the lens of my invention it is almost impossible to obtain outside light conditions which will give a false signal of any recognizable value, and never will a false signal be given of sufficient intensity to confuse the onlooker. However, when the interior light source is illuminated, the strong light from the light bulb 5 passes through the frosted surface, through the prisms 27, through the thick part 26 of the rear component, and thence onto the outside colorless component 22, giving a strong, brilliant illumination which cannot be mistaken, even in daylight or under the glare of following headlights at night.

I have therefore provided a signal lens which may be utilized either in indexing configuration or not, as desired, which will give a minimum response upon application of outside light but a maximum response from an interior light source, thus providing a signal to an onlooker which will never be confusing, even under the most severe combinations of outside illumination.

I claim:

1. The method of preventing false color illumination of a colored signal lamp window, which comprises overlaying said window with a colorless material, providing a highly reflective joint between said colorless material and said window, and roughening the rear surface of said window to reduce reflection of outside light passing through said joint.

2. A composite window for a lamp house having a light source therein comprising adjacent inside and outside bodies of light transmitting material in the path of light from said source, said bodies being in substantial contact over a planar surface substantially at a right angle to the light beam from said source, the inner surface of said outside body being polished and light reflective, and the inner surface of said inside body being frosted.

3. A composite window in accordance with claim 2, wherein both of said bodies are formed from a moldable plastic, and a single opaque mask around the edges of both of said bodies and interlocking therewith.

4. A composite window in accordance with claim 2, wherein said outside body is substantially semi-circular in section along its shortest dimension, and wherein the inner surface of said inside body is formed into prismatic ridges, said inside body having a thicker cross-section thereof adjacent the center of said cross-section than at the edges thereof to correspond with the increased thickness of the outside body due to the semi-circular section thereof.

5. A composite window for a lamp house having a light source therein comprising an inside body of colored light transmitting material, an adjacent outside body of colorless light transmitting material, said bodies being in the path of light from said source, the inner surface of said colorless outside body being light reflective and the inside surface of said colored inside body being light diffusive, the said inside and outside bodies being in substantial contact over a planar surface substantially at a right angle to the light beam from said source.

WAGN TRAUTNER.